(12) United States Patent
Oettinger

(10) Patent No.: US 10,525,556 B2
(45) Date of Patent: Jan. 7, 2020

(54) SEPARATING COMPONENTS OF A POCKET SPRUNG MATTRESS SUB-ASSEMBLY

(71) Applicant: The Furniture Recycling Group Limited, Blackburn (GB)

(72) Inventor: Nicholas Simon Oettinger, Preston (GB)

(73) Assignee: The Furniture Recycling Group Limited, Blackburn (GB)

( * ) Notice: Subject to any disclaimer, the term of this patent is extended or adjusted under 35 U.S.C. 154(b) by 159 days.

(21) Appl. No.: 15/423,620

(22) Filed: Feb. 3, 2017

(65) Prior Publication Data
US 2017/0216980 A1 Aug. 3, 2017

(30) Foreign Application Priority Data

Feb. 3, 2016 (GB) .................................. 1601978.8

(51) Int. Cl.
| | | |
|---|---|---|
| B23P 19/00 | (2006.01) | |
| B23P 19/04 | (2006.01) | |
| A47C 27/06 | (2006.01) | |
| B02C 18/06 | (2006.01) | |
| B02C 18/22 | (2006.01) | |
| B09B 3/00 | (2006.01) | |
| B68G 15/00 | (2006.01) | |

(52) U.S. Cl.
CPC .......... *B23P 19/048* (2013.01); *A47C 27/064* (2013.01); *B02C 18/06* (2013.01); *B02C 18/2225* (2013.01); *B02C 18/2283* (2013.01); *B09B 3/00* (2013.01); *B68G 15/00* (2013.01)

(58) Field of Classification Search
CPC . B02C 18/2283; B02C 18/06; B02C 18/2225; B23P 19/048; B09B 3/00
See application file for complete search history.

(56) References Cited

U.S. PATENT DOCUMENTS

| | | | |
|---|---|---|---|
| 6,016,979 A | 1/2000 | Squires | |
| 8,407,884 B2 * | 4/2013 | Rudolf | A47C 27/00 29/426.1 |
| 2008/0282476 A1 * | 11/2008 | Lundevall | A47C 27/063 5/720 |
| 2011/0197436 A1 * | 8/2011 | Rudolf | A47C 27/00 29/700 |

(Continued)

FOREIGN PATENT DOCUMENTS

| | | |
|---|---|---|
| CN | 203853369 U | 10/2014 |
| CN | 104607270 A | 5/2015 |

(Continued)

*Primary Examiner* — Faye Francis
(74) *Attorney, Agent, or Firm* — James Creighton Wray

(57) ABSTRACT

Components of a pocket-sprung-mattress sub-assembly having individual metal springs retained within a matrix of fabric pockets are separated. A rotatable tearing drum 405 is driven by a drive motor 406. Tearing devices 407 are arranged to pull metal springs from a pocket-sprung-mattress sub-assembly during the rotation of the tearing drum 405. A feeding assembly 408 compressors an end portion of the mattress sub-assembly and moves this end portion continually to bring an end of the mattress sub-assembly into contact with the rotating tearing devices 407.

18 Claims, 8 Drawing Sheets

(56) References Cited

U.S. PATENT DOCUMENTS

| | | | |
|---|---|---|---|
| 2015/0217300 A1* | 8/2015 | Cooke | B26F 3/004 241/3 |
| 2015/0283659 A1 | 10/2015 | Gilbert | |
| 2016/0264397 A1* | 9/2016 | Wagenaar | B26D 3/282 |

FOREIGN PATENT DOCUMENTS

| | | |
|---|---|---|
| JP | 2001096265 A | 4/2001 |
| JP | 2009082840 A | 4/2009 |
| JP | 2015062863 A | 4/2015 |
| KR | 20120064205 A | 6/2012 |
| TW | 516985 B | 1/2003 |

\* cited by examiner

SEPARATING COMPONENTS OF A POCKET SPRUNG MATTRESS SUB-ASSEMBLY

CROSS REFERENCE TO RELATED APPLICATIONS

This application claims priority from United Kingdom patent application No 16 01 978.8, filed Feb. 3, 2016, the entire disclosure of which is incorporated herein by reference in its entirety.

BACKGROUND OF THE INVENTION

The present invention relates to an apparatus for separating components of a pocket sprung mattress sub-assembly, in which individual metal springs are retained within a matrix of fabric pockets. The present invention also relates to a method of separating components of a pocket sprung mattress sub-assembly.

It is known to recycle spring-containing mattresses, as described in U.S. Pat. No. 6,016,979. The manual handling of springs is difficult, given that their movements are somewhat unpredictable and when exposed, they tend to present dangerous sharp edges. The system disclosed in the aforesaid United States patent publication performs a cutting and crushing operation to yield spring particles that can be processed further or handled manually without risk of injury.

A problem with this known approach is that very high grade cutting blades are required in order to cut through the spring steel present within the mattresses. Even high grade cutting blades, including carbide laminates, will degrade and require replacement, thereby increasing overall running costs. The equipment itself tends to be expensive, replacement of worn parts becomes expensive and further unpredictable costs are often involved during periods when the machine cannot actually be operated; due to the presence of a jam or due to routine repair. Consequently, machines of this type tend to be uneconomic for recycling mattresses containing pocket springs or the recycling of pocket sprung sub-assemblies.

BRIEF SUMMARY OF THE INVENTION

According to a first aspect of the present invention, there is provided an apparatus for separating components of a pocket-sprung-mattress sub-assembly, in which individual metal springs are retained within a matrix of fabric pockets, comprising: a rotatable tearing drum; a drive motor arranged to rotate said tearing drum; a plurality of tearing devices, each arranged to pull metal springs from a pocket-sprung-mattress sub-assembly during the rotation of said tearing drum; and a feeding assembly configured to: compress an end portion of said pocket-sprung-mattress sub-assembly; and move said end portion continually to bring an end of said pocket-sprung-mattress sub-assembly into contact with said rotating tearing devices.

In an embodiment, the feeding assembly includes a first feed roller and a second feed roller. The first feed roller and the second feed roller may include protrusions for gripping a pocket-sprung-mattress sub-assembly.

Preferably, said feeding assembly also includes an anvil plate, wherein said anvil plate is positioned between said rotating drum and said feed rollers; and said anvil plate is configured to support an end portion of a pocket-sprung-mattress sub-assembly while said tearing devices tear against and pull metal springs from said pocket-sprung-mattress sub-assembly.

According to a second aspect of the present invention, there is provided a method of separating components of a pocket-sprung-mattress sub-assembly, in which individual metal springs are retained within pockets, comprising the steps of: compressing an end portion of a pocket-sprung-mattress sub-assembly; feeding said compressed end portion of said pocket-sprung-mattress sub-assembly towards a plurality of tearing devices supported on a rotating drum; piercing said pockets by means of said tearing devices; pulling individual springs out from their respective pocket; and releasing pulled-out springs for subsequent collection.

DETAILED DESCRIPTION OF THE INVENTION

FIG. 1

Figure 1:
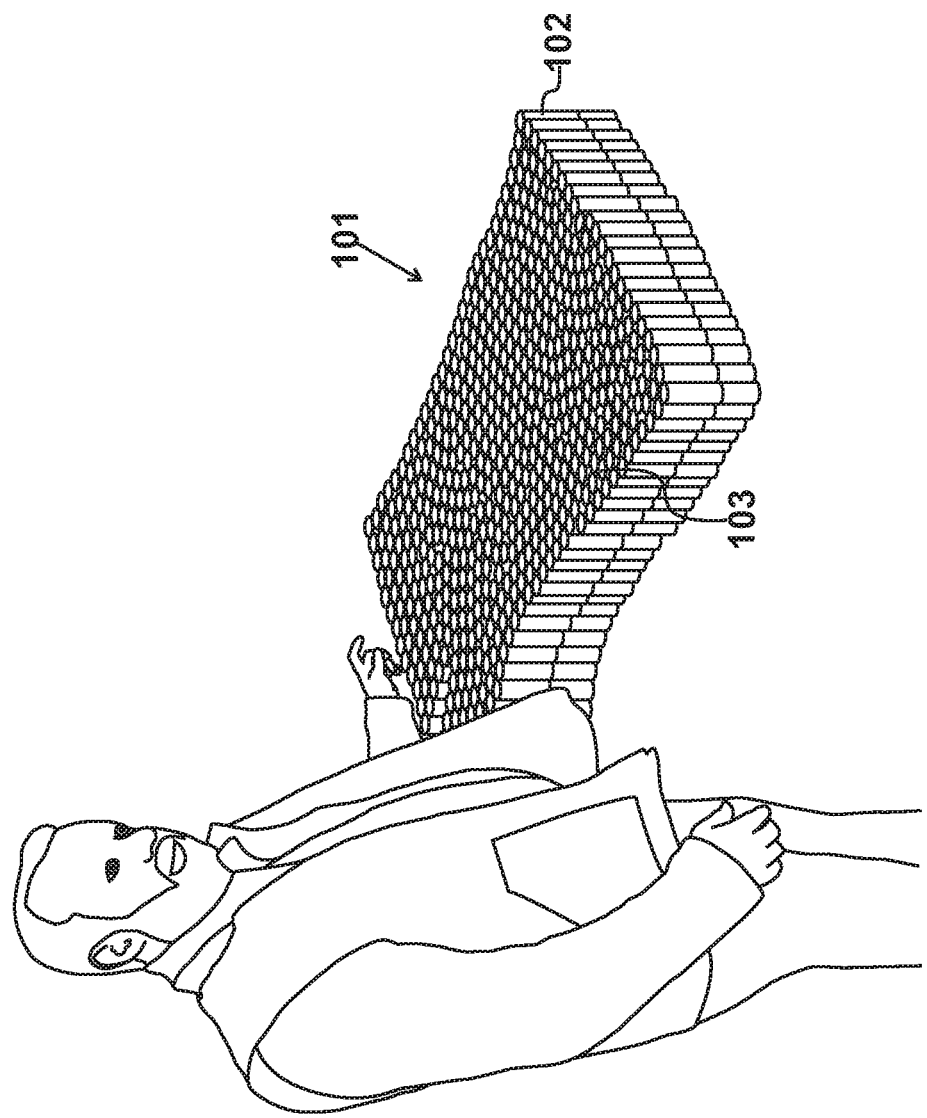
FIG. 1 shows a pocket-sprung-mattress sub-assembly.

A pocket-sprung-mattress sub-assembly is shown in FIG. 1. As part of a recycling exercise, components surrounding the sub-assembly, in order to complete the mattress, have been removed. The remaining sub-assembly consists of individual coils 102, each surrounded by a polypropylene or similar material pocket 103. These pockets are in turn glued together on all sides to form the complete spring sub-assembly.

Assemblies of this type are difficult to recycle, therefore existing recycling operations are uneconomic and it is usual for sub-assemblies of this type be directed toward landfill. It is possible to remove the springs by hand but this is time consuming and dangerous. Furthermore known shredding operations are difficult to implement, given that the steel present within the springs will tend to damage shredding machines, causing the machine to jam when a subsequent batch is introduced. Thus, known automated techniques fail to meet their expectations, in terms of the actual through-put that they can achieve; again rendering the whole exercise uneconomic.

FIG. 2

Figure 2:
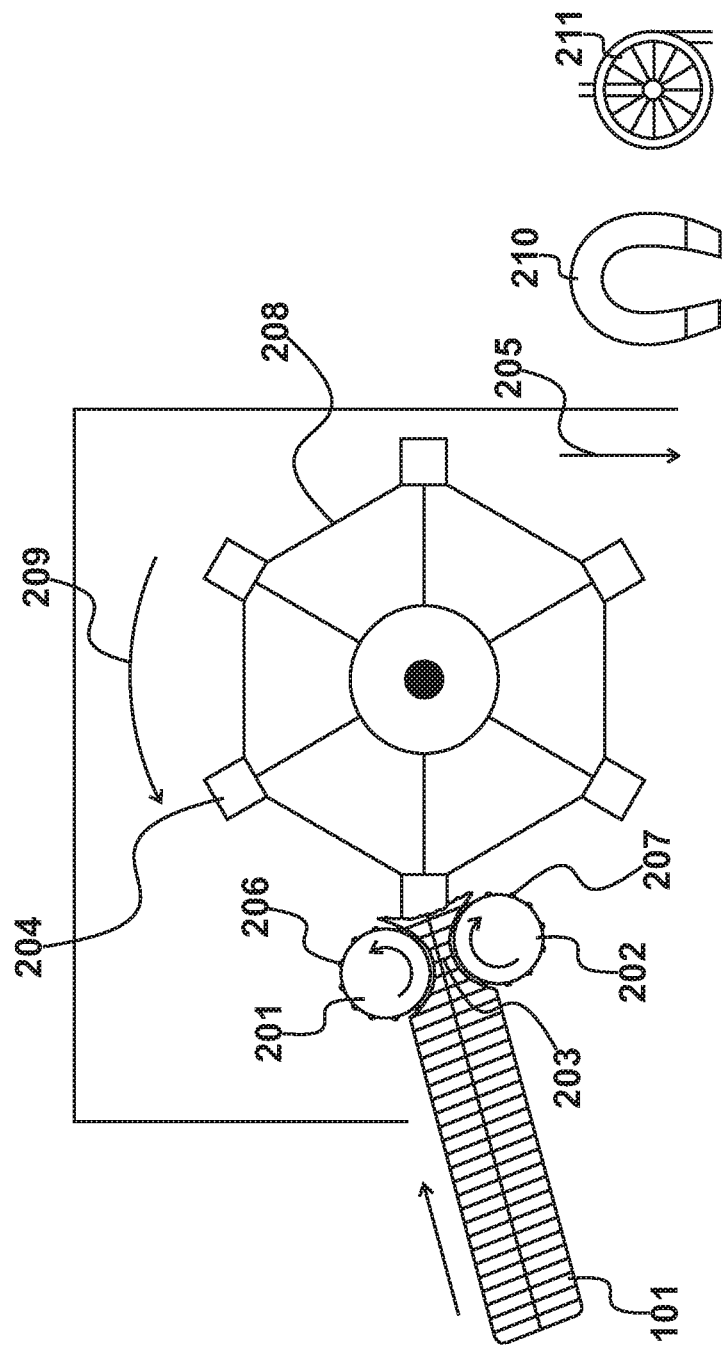
FIG. 2 shows a schematic representation of a method for separating components of the pocket-sprung-mattress sub-assembly shown in FIG. 1.

A schematic representation of a method for separating components of a pocket sprung sub-assembly is illustrated in FIG. 2. Individual metal springs are retained within pockets to form sub-assembly 101. The sub-assembly 101 is compressed between a first feed roller 201 and a second feed roller 202. This forms a compressed portion 203 of the sub-assembly 101, that is fed towards a plurality of tearing devices 204. The tearing devices 204 are configured to pierce individual pockets and then pull individual springs out from their respective pocket. The released pulled-out springs are then released for subsequent collection, after falling in the direction of arrow 205.

Thus, in this way, an end portion of a pocket-sprung-mattress sub-assembly is compressed. This compressed end portion is then fed towards tearing devices supported on a rotating drum 208. Pockets are pierced by the tearing devices which then pull individual springs out from their respective pocket, whereafter the pulled out springs are released for subsequent collection.

In an embodiment, the compressing step may compress the sub-assembly by at least one third and the feeding step may be facilitated by the presence of first protrusions 206 extending from the first feed roller 201 and second protrusions 207 extending from the second feed roller 202. The piercing step is facilitated by supporting the tearing devices upon a rotating drum 208, configured to rotate in the direction of arrow 209.

To further enhance the separation process, recycled steel may be displaced by magnetism, illustrated by magnet 210 and the pocket material may be displaced by air, represented by air blower 211.

FIG. 3

Figure 3:
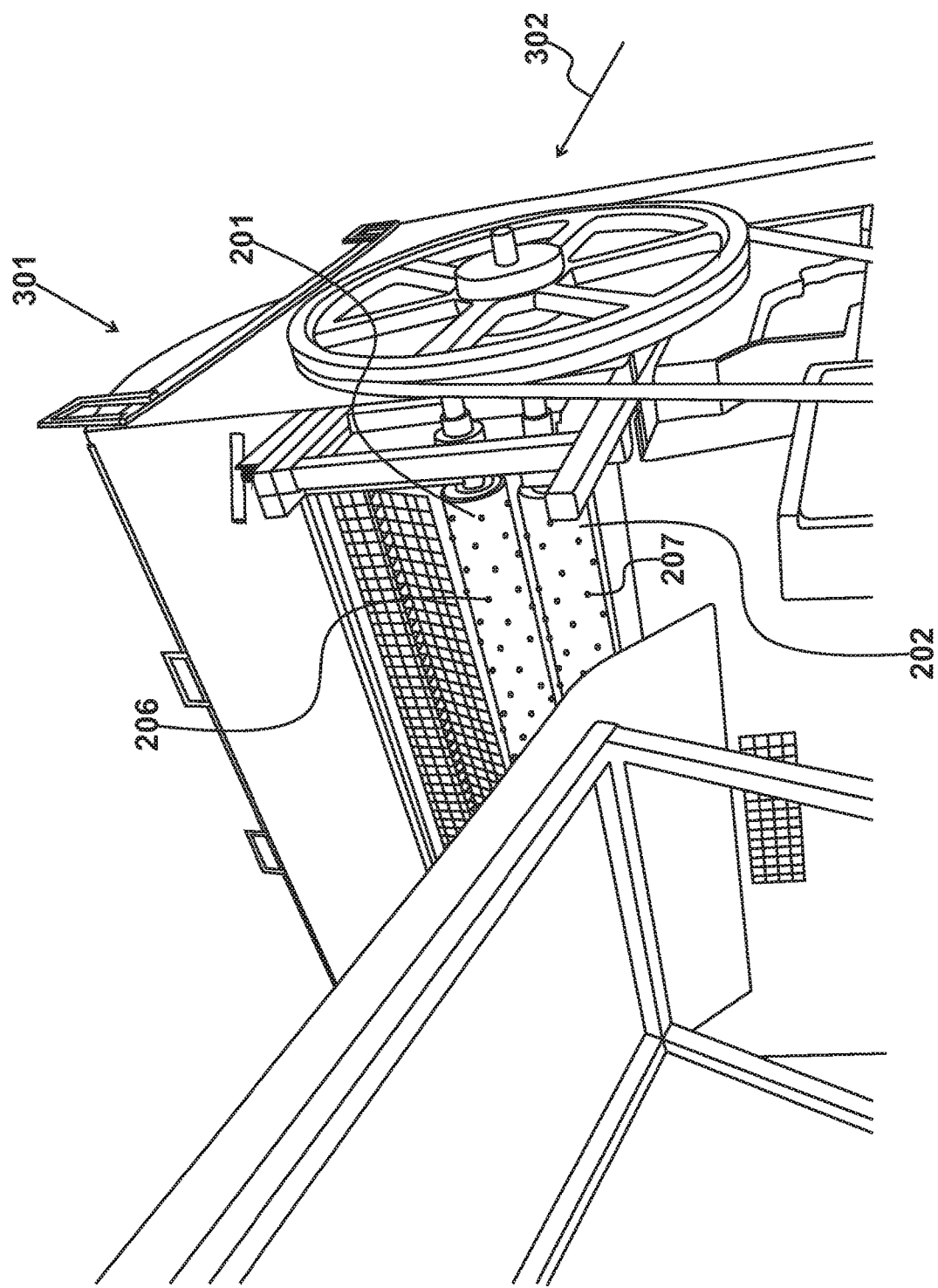
FIG. 3 details an apparatus for separating components of the pocket-sprung-mattress sub-assembly identified in FIG. 1.

An apparatus for separating components of a pocket-sprung-mattress sub-assembly is illustrated in FIG. 3. In a sub-assembly of this type, individual metal springs are retained within a matrix of fabric pockets. The apparatus has a first feed roller 201 and a second feed roller 202. In combination, the first feed roller 201 and the second feed roller 202 are configured to compress the sub-assembly and feed the sub-assembly into the apparatus 301.

Figure 7:
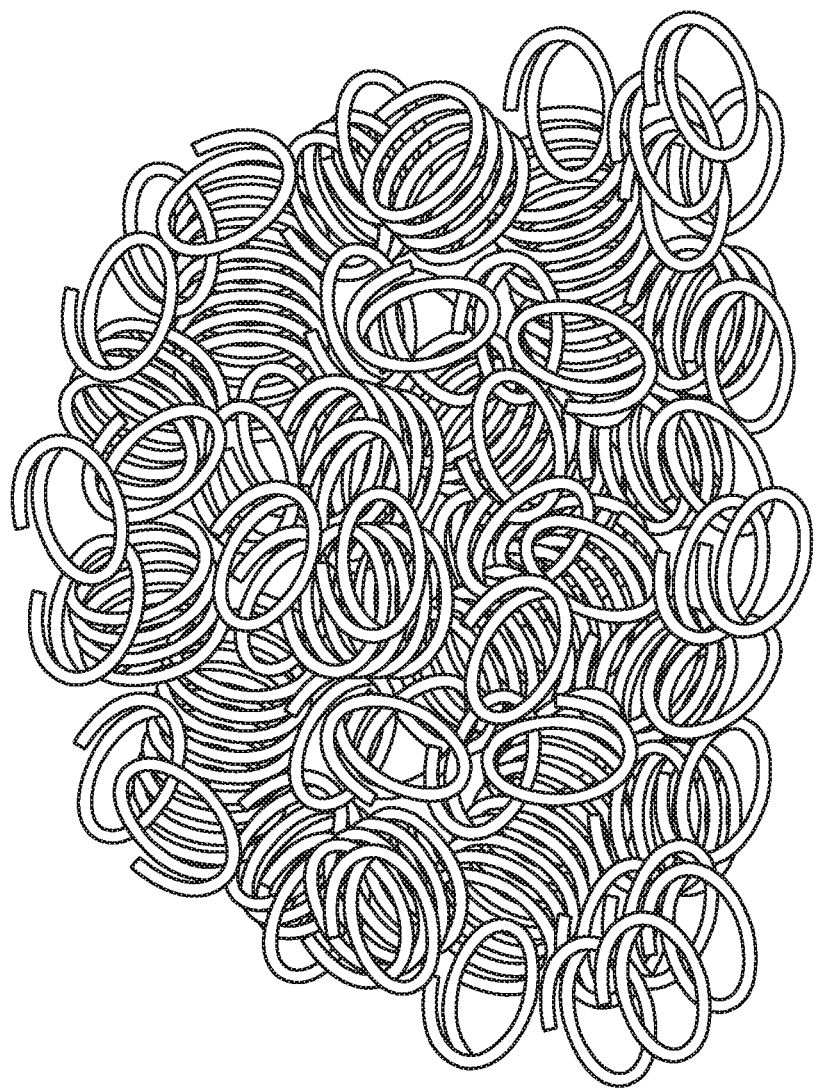
FIG. 7 shows separated springs.
Figure 8:
FIG. 8 shows separated material.

Inside the apparatus 301, there are a plurality of moving tearing devices, each configured to pierce a fabric pocket containing a spring, engage with the spring, pull the spring from the fabric matrix and release the spring for subsequent collection. It is then possible, as illustrated in FIG. 2, for a magnet 210 to attract the steel springs for subsequent collection, as illustrated in FIG. 7. Furthermore, again as illustrated in FIG. 2, the fabric pockets may be polypropylene and the apparatus may include a fan 211 for directing separated scraps of polypropylene, so as to collect the polypropylene together; as illustrated in FIG. 8.

As described with reference to FIG. 2, the pocket-sprung-mattress sub-assembly has a non-compressed depth and the combination of said first feed roller 201 and said second feed roller 202 may compress a mattress sub-assembly to a compression depth, wherein said non-compressed depth is at least three times greater than said compressed depth. Preferably, the first feed roller 201 includes protrusions 206 and the second feed roller includes protrusions 207 for gripping a sub-assembly.

FIG. 4

Figure 4:
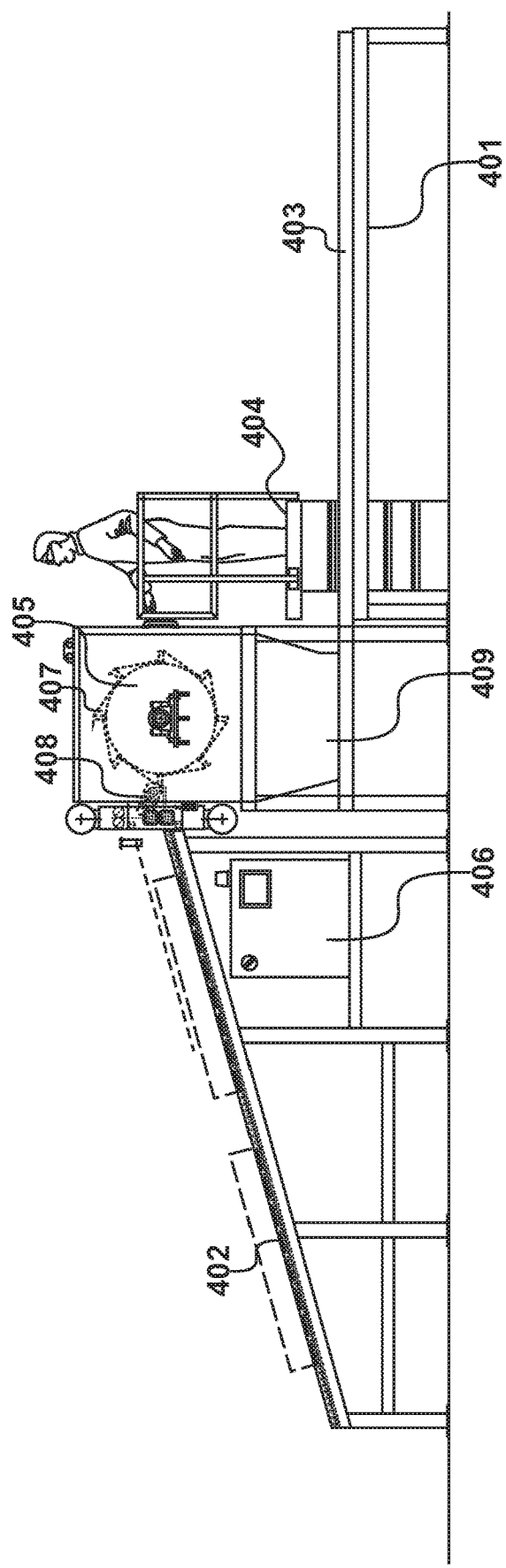
FIG. 4 shows a sectional view of the apparatus identified in FIG. 3.

A sectional view of the apparatus identified in FIG. 3 is shown in FIG. 4. A support framework 401 supports the apparatus and provides support for a powered infeed conveyor 402 and a powered outfeed belt conveyer 403. During operation, an operator may operate the apparatus while standing on a platform 404. Thus, pocket-sprung-mattress sub-assemblies are introduced to the infeed conveyor 402, which in turn introduces them to a rotatable tearing drum 405. A drive motor 406 is arranged to rotate the tearing drum 405 which is itself provided with tearing devices 407. Each tearing device 407 is arranged to pull metal springs from pocket-sprung-mattress sub-assemblies while the drum 405 is rotating.

A feeding assembly 408 is configured to compress an end portion of pocket-sprung-mattress sub-assemblies introduced by the feed conveyor 402. Furthermore, the feeding assembly 408 is also configured to move compressed end portions continually, to bring the ends of mattress sub-assemblies into contact with the rotating tearing devices. Thereafter, the separated material falls onto the outfeed conveyor 403 via an outlet chute 409.

FIG. 5

Figure 5:
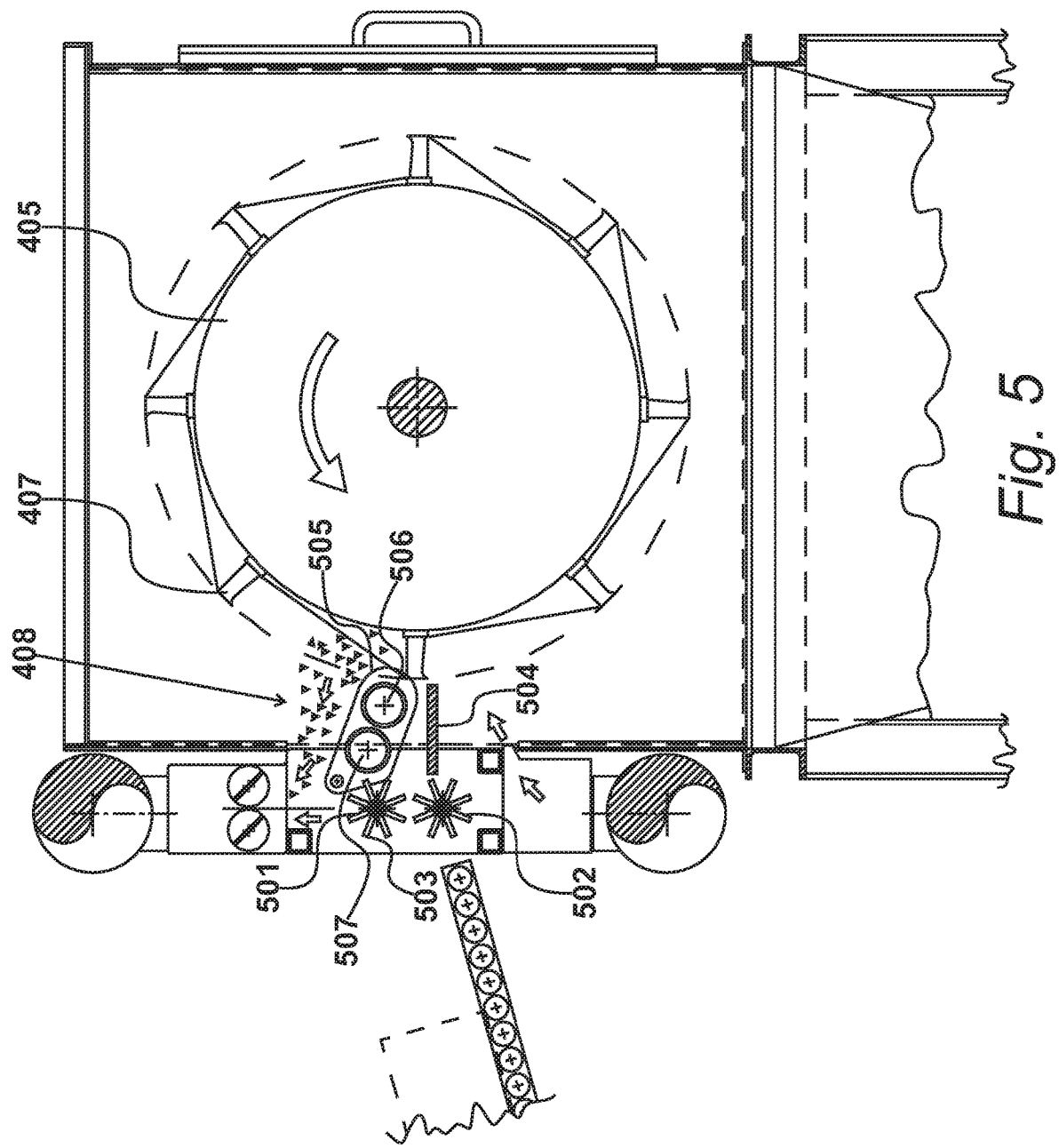
FIG. 5 details a rotatable tearing drum identified in FIG. 4.

Rotatable tearing drum 405 is shown in greater detail in FIG. 5. In this embodiment, the feeding assembly 408 includes a first feed roller 501 and a second feed roller 502. These feed rollers may include protrusions, as illustrated in FIG. 3, or extended fins 503, as illustrated in FIG. 5.

The feeding assembly 408 also includes an anvil plate 504 that is positioned between the rotating drum 405 and the feed rollers 501, 502. The anvil plate 504 is configured to support an end portion of a mattress sub-assembly while tearing devices 407 tear against and pull metal springs from the mattress sub-assembly.

In this embodiment, the feeding sub-assembly further comprises a top pressure rolling device 505, that is arranged to force a pocket-sprung-mattress sub-assembly onto the anvil plate 504. In this embodiment, the top pressure device 505 includes a first top pressure roller 506 and a second top pressure roller 507.

FIG. 6

Figure 6:
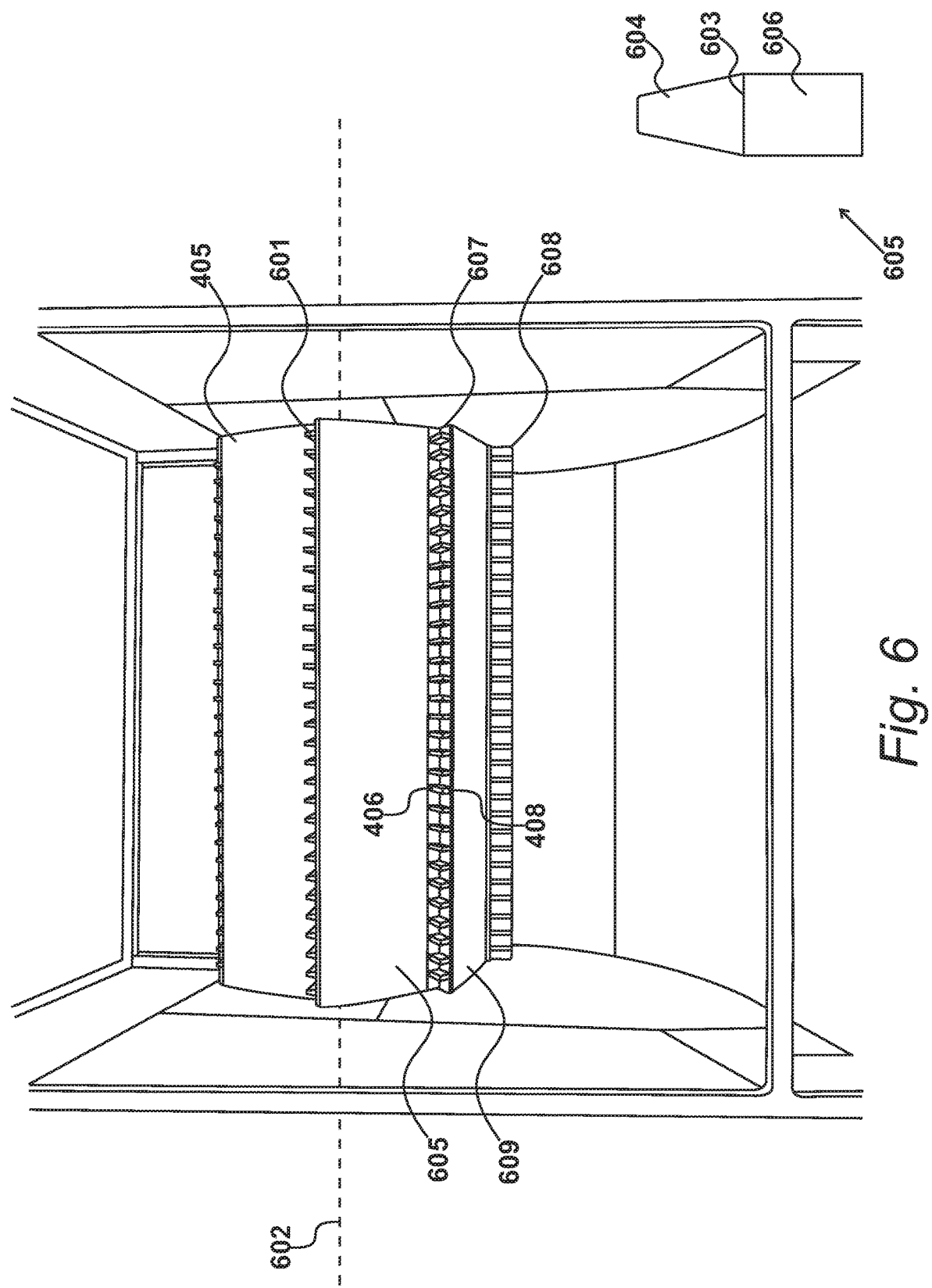
FIG. 6 details an alternative view of the apparatus shown in FIG. 3.

A view inside the apparatus 301, viewed up the outlet chute 409, is shown in FIG. 6. Tearing devices 601 are supported on the drum 405. In the orientation shown, drum 405 rotates about an axis of rotation 602. Each tearing device has a tearing edge 603 defined by a first face 604 that extends substantially normal to a circumferential surface 605 of the drum 405. In addition, the tearing edge is also defined by a second face 606 that is substantially parallel to circumferential surface 604. An enlarged tearing device is shown at 605.

In the arrangements shown in FIG. 6, the tearing devices are arranged in a plurality of rows, including row 607 and row 608. Each of these rows lie substantially parallel to the axis of rotation 602. Furthermore, in the embodiment of FIG. 6, the drum is constructed by the provision of a drum plates 609, that extend from a first row 607 of tearing devices to a next row 608 of tearing devices.

FIG. 7

After disengaging from a respective tearing device, the steel springs exit via the feed conveyor 402. By the application of magnetism, it is possible to direct the steel springs into a specified region, as illustrated in FIG. 7, for subsequent collection.

FIG. 8

In addition to blower 211, illustrated schematically in FIG. 2, additional blowers may be provided within the apparatus 301. In this way, as the steel components fall fabric components, usually of polypropylene, can be directed elsewhere for subsequent collection, as illustrated in FIG. 8.

The invention claimed is:

1. An apparatus for separating components of a pocket-sprung-mattress sub-assembly, in which individual metal springs are retained within a matrix of fabric pockets, comprising:
   a rotatable tearing drum;
   a drive motor arranged to rotate said tearing drum;
   a plurality of tearing devices, each arranged to pierce and tear the fabric pockets and to pull metal springs from a pocket-sprung-mattress sub-assembly during the rotation of said tearing drum; and
   a feeding assembly configured to:
   compress an end portion of said mattress sub-assembly; and
   move said end portion continually to bring an end of said mattress sub-assembly into contact with said rotating tearing devices.

2. The apparatus of claim 1, wherein:
   the apparatus includes a magnet for collecting spring components after separation.

3. The apparatus of claim 1, wherein;
   the apparatus includes a fan for directing separated scraps of the pierced and torn fabric pockets.

4. The apparatus of claim 1, wherein:
   the pocket-sprung-mattress sub-assembly has a non-compressed depth; and
   said feeding assembly further comprises a first feed roller and a second feed roller and compresses the pocket-sprung-mattress sub-assembly to a compressed depth, wherein said non-compressed depth is at least three times greater than said compressed depth.

5. The apparatus of claim 1, wherein said feeding assembly includes a first feed roller and a second feed roller.

6. The apparatus of claim 5, wherein said first feed roller and said second feed roller include protrusions for gripping the pocket-sprung-mattress sub-assembly.

7. The apparatus of claim 5, wherein:
   said feeding assembly includes an anvil plate;
   said anvil plate is positioned between said rotating drum and said first and second feed rollers; and
   said anvil plate is configured to support an end portion of the pocket-sprung-mattress sub-assembly while said tearing devices pierce and tear the fabric pockets and pull the metal springs from said pocket-sprung-mattress sub-assembly.

8. The apparatus of claim 7, further comprising a top pressure rolling device positioned above the anvil plate and arranged to force the pocket-sprung-mattress sub-assembly onto said anvil plate.

9. The apparatus of claim 8, wherein said top pressure rolling device includes a first top pressure roller and a second top pressure roller.

10. The apparatus of claim 1, wherein each said tearing device has a tearing edge defined by a first face that extends perpendicular to a circumferential surface of said rotatable tearing drum.

11. The apparatus of claim 10, wherein said tearing edge is also defined by a second face parallel to said circumferential surface.

12. The apparatus of any of claim 1, wherein:
   said rotatable tearing drum has an axis of rotation; and
   said tearing devices are arranged in a plurality of rows, with each said row lying parallel to said axis of rotation.

13. The apparatus of claim 12, wherein a drum plate extends from a first row of said tearing devices to a next row of said tearing devices.

14. A method of separating components of a pocket sprung sub-assembly, in which individual metal springs are retained within pockets, comprising the steps of:
   compressing an end portion of the pocket-sprung-mattress sub-assembly;
   feeding said compressed end portion of said pocket-sprung-mattress sub-assembly towards a plurality of tearing devices supported on a rotating drum;
   piercing said pockets by means of said tearing devices;
   pulling individual springs out from their respective pocket; and
   releasing pulled-out springs for subsequent collection.

15. The method of claim 14, wherein said compressing step is initially performed by feeding the pocket-sprung-mattress sub-assembly between a first feed roller and a second feed roller.

16. The method of claim 14, wherein said compressing step is subsequently performed by top pressure rollers acting upon an anvil plate.

17. The method of claim 14, wherein said piercing step is facilitated by supporting said tearing devices upon a rotating drum.

18. The method of claim 14, wherein pulled-out springs are displaced by magnetism and pocket-material from the pierced pockets is displaced by forced air.

* * * * *